United States Patent
Godard et al.

(10) Patent No.: US 9,959,119 B2
(45) Date of Patent: May 1, 2018

(54) COMPUTER PROCESSOR EMPLOYING DOUBLE-ENDED INSTRUCTION DECODING

(71) Applicant: Mill Computing, Inc., Palo Alto, CA (US)

(72) Inventors: Roger Rawson Godard, East Palo Alto, CA (US); Arthur David Kahlich, Sunnyvale, CA (US); David Arthur Yost, Los Altos, CA (US)

(73) Assignee: MILL COMPUTING, INC., Palo Alto, CA (US)

( * ) Notice: Subject to any disclaimer, the term of this patent is extended or adjusted under 35 U.S.C. 154(b) by 303 days.

(21) Appl. No.: 14/290,161

(22) Filed: May 29, 2014

(65) Prior Publication Data

US 2015/0347142 A1 Dec. 3, 2015

(51) Int. Cl.
*G06F 9/38* (2006.01)
*G06F 12/08* (2016.01)
(Continued)

(52) U.S. Cl.
CPC .......... *G06F 9/30149* (2013.01); *G06F 9/382* (2013.01); *G06F 9/3822* (2013.01);
(Continued)

(58) Field of Classification Search
CPC .................................................. G06F 9/30149
See application file for complete search history.

(56) References Cited

U.S. PATENT DOCUMENTS

| 5,941,982 A * | 8/1999 | Ginosar | G06F 9/30152 |
| | | | 712/210 |
| 6,496,920 B1 * | 12/2002 | Zou | G06F 9/30014 |
| | | | 712/33 |

(Continued)

OTHER PUBLICATIONS

The Heads and Tails Instruction Format, Heidi Pan and Krste Asanovic, MIT Laboratory for Computer Science, Mar. 2003, pp. 131-132.

(Continued)

*Primary Examiner* — Keith Vicary
*Assistant Examiner* — William Nguyen
(74) *Attorney, Agent, or Firm* — Gordon & Jacobson, P.C.

(57) ABSTRACT

A computer processor including an instruction buffer configured to store at least one variable-length instruction having a bit bundle bounded by a head end and a tail end with a plurality of slots each defining a corresponding operation, wherein the plurality of slots and corresponding operations are logically partitioned into a plurality of distinct blocks with a first group of blocks extending from the head end of the bit bundle toward the tail end of the bit bundle and a second group of blocks extending from the tail end of the bit bundle toward the head end of the bit bundle, wherein the second group of blocks includes a tail end block disposed adjacent the tail end of the bit bundle. A decode stage is operably coupled to the instruction buffer and configured to process a given variable-length instruction stored by the instruction buffer by decoding at least one operation of a particular block belonging to the first group of blocks in parallel with decoding at least one operation of the tail end block. Additional aspects are described and claimed.

27 Claims, 3 Drawing Sheets

(51) Int. Cl.
  *G06F 9/30* (2018.01)
  *G06F 12/0875* (2016.01)
  *G06F 12/0886* (2016.01)
(52) U.S. Cl.
  CPC ...... *G06F 12/0875* (2013.01); *G06F 12/0886* (2013.01); *G06F 2212/452* (2013.01)

(56) References Cited

U.S. PATENT DOCUMENTS

| | | | |
|---|---|---|---|
| 7,818,542 B2 | 10/2010 | Shen et al. | |
| 8,402,252 B2 | 3/2013 | Coke et al. | |
| 2002/0167427 A1* | 11/2002 | Furuta | H04N 21/23892 341/67 |
| 2003/0236964 A1* | 12/2003 | Madduri | G06F 9/30145 712/204 |
| 2008/0250229 A1* | 10/2008 | Stempel | G06F 9/30047 712/210 |
| 2010/0306292 A1* | 12/2010 | Catherwood | G06F 9/30014 708/209 |

OTHER PUBLICATIONS

Heads and Tails: A Variable-Length Instruction Format Supporting Parallel Fetch and Decode, Heidi Pan and Krste Asanovic, CASES'01, Nov. 16-17, 2001, ACM 1581133995/01/0011.

* cited by examiner

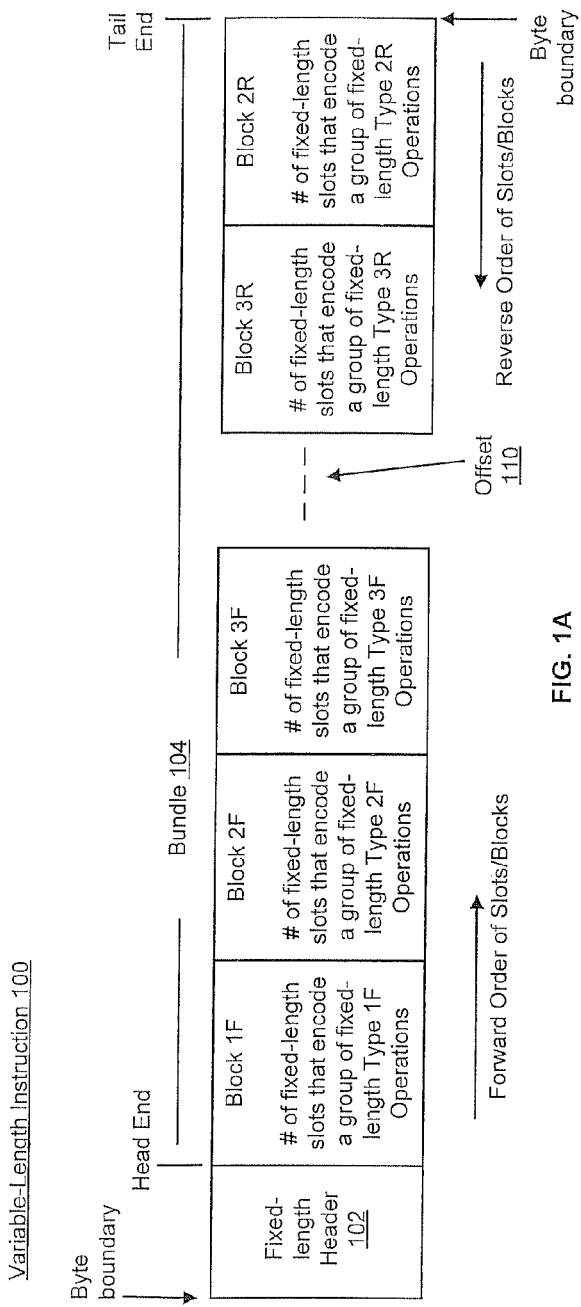
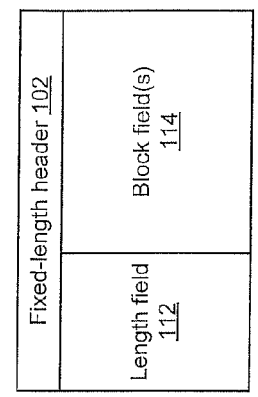
FIG. 1A
FIG. 1B

COMPUTER PROCESSOR EMPLOYING DOUBLE-ENDED INSTRUCTION DECODING

BACKGROUND

1. Field

The present application relates to computer processors.

2. Related Art

A computer processor (or central processing unit or CPU) executes a sequence of instructions, typically obtained from main memory, which are executed in positional order except when redirected by a branch, jump, call, or similar control-flow operation. The order is important because there are often semantic dependencies between pairs of instructions and the machine state would be different if the instructions were executed in a different order; that is, instruction execution is not commutative. However, strict order is not always required for a particular pair of instructions, and an important class of CPU architectures (called out-of-order execution (OOO) machines) detects the presence of semantic dependencies and reorders the execution of instructions in ways that preserve semantics while improving execution performance. Nevertheless, for nearly all CPU architectures, the original program instruction order is used as an implicit specification of the intended program semantics, whether reordered later or not.

There is little to be gained by reordering when the CPU can execute only one instruction at a time. After all, if every instruction operation has to be executed individually then any ordering should take as long to execute as any other. However, in the quest for CPU performance, computer designers have created CPUs that are capable of performing more than one operation simultaneously, in parallel. Clearly, if the program calls for two instructions to be executed in sequence, but they are actually executed simultaneously, then any semantic dependency between them will be violated. An OOO-architecture CPU can detect when two instructions, while sequential in the program, are independent and thus can be executed simultaneously. This permits the CPU to perform both instructions in parallel, shortening the total execution time of the program. The hardware to perform OOO reordering is large, difficult to design, and costly in chip area, power, and clock rate impact. Nevertheless it can yield significant gains when the program instruction set interface specifies a single, nominally sequential, instruction stream. However, there are ways to obtain parallel execution by using a different approach to specifying instruction semantics.

One common approach to obtain parallel execution is referred to as "multi-threading," where the program is specified not as a single sequential stream of instructions, but as several such streams. Sequential semantics are enforced within any single stream of instructions, but the streams themselves are considered to be independent and instructions between streams can be executed in any order except for certain specialized instructions which serve to synchronize the streams. Each stream may be executed by its own sub-CPU or pipeline, or the streams may be interleaved on a single CPU such that each uses resources left idle by the others.

In another approach to obtain parallel execution, typified by Very Long Instruction Word (VLIW) architectures, there is only one instruction stream, but each instruction may have several operations which are executed in parallel. In essence, a VLIW sees multiple operation streams rather than multiple instruction streams, where operations from multiple operation streams are concatenated together to form a single instruction in a single instruction stream. Each position at which an operation can reside within the instruction is called a slot. Because the operations of each slot are in a shared instruction, the multiple operations streams are synchronized at every cycle and advance in lock step. Consequently, an operation executed in a given cycle may be semantically dependent on any operation executed earlier and operations that are executed in later cycles may be semantically dependent on it, but operations (from a single instruction) executed in the same cycle cannot be dependent on each other. So long as there are at least as many independent operations in a cycle as there are slots then all slots can be kept busy; if not then some slots must remain idle. Code generation software such as compilers analyze the program and assign individual operations to the slots so as to maximize performance. This task, called static scheduling, is similar to what an OOO machine does in dynamic scheduling hardware during execution. But because it is done once, in advance, and by software able to statically analyze and optimize future execution, the result is a much cheaper CPU and generally better performance for a large class of programs.

The instruction and operation streams described here are abstract notions, which must be encoded as a sequence of primitive operations defined by bits in memory that are fetched and executed by the CPU. The encodings used by different CPU architectures vary greatly from each other, but all seek to balance ease of interpretation by hardware decode machinery against compactness of representation. In most architectures, the instructions are intended to be executed in a particular order as an instruction stream, where the execution order is usually determined by the address order of the instructions in memory but may be changed as a consequence of the execution of flow of control operations in the instruction stream as described above with respect to OOO machines.

Broadly, there are two sorts of encodings used for instructions: fixed-length encodings and variable-length encodings. In a fixed-length encoding, each instruction uses a single fixed number of bits for its representation, for example 32 bits. In a variable-length encoding, different instructions use different bit-lengths where the bit-length for a particular instruction is typically selected by minimizing the number of bits required to convey the semantics of that particular instruction. Thus, some instructions may be 8 bits in length, others 16 bits, 56 bits or whatever. The fixed-length encoding approach is commonly associated with RISC (Reduced Instruction Set Computer) designs typified by the SPARC instruction set architecture, while the variable-length encoding approach is commonly associated with CISC (Complex Instruction Set Computer) designs typified by x86 instruction set architectures.

In general, fixed-length encodings are relatively easy to decode, and it is especially easy to decode several operations simultaneously in parallel because it is known a priori where in memory each operation starts. Parallel decode reads in a block of operations, breaks them at operation boundaries, and gives each of them to independent decoders. However, fixed length encodings are not compact, because the semantics of many kinds of operation can be represented in fewer bits than the fixed length. Other kinds of operation need more bits than the encoding length and so a single logical operation must be represented awkwardly as two or more of the fixed length operation.

By contrast, variable-length encodings tend to be quite compact, which is economical of memory space and reduces the load on memory pathways arising from instruction fetch.

However, the decode machinery does not know the length of a particular variable-length operation until it has examined it, a process called parsing the operation. This is a problem for modern architectures that execute several operations in parallel. While the decode hardware that parses operations can fetch a block of memory that contains several operations, it cannot know where any operation after the first begins until after it has parsed all prior operations. This serializes operation parse, whereas the fixed length encodings can be easily parsed in parallel. Schemes for parallel decode of variable length operations (despite the serial parse) exist, but are difficult to realize and very expensive in hardware and power consumption.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processor (and corresponding method of instruction processing) that includes an instruction buffer configured to store at least one variable-length instruction having a bit bundle bounded by a head end and a tail end. The bit bundle includes a number of slots each defining a corresponding operation. The slots and corresponding operations are logically partitioned into a number of distinct blocks with a first group of blocks extending from the head end of the bit bundle toward the tail end of the bit bundle and a second group of blocks extending from the tail end of the bit bundle toward the head end of the bit bundle. The second group of blocks includes a tail end block disposed adjacent the tail end of the bit bundle. A decode stage is operably coupled to the instruction buffer. The decode state is configured to process a given variable-length instruction stored by the instruction buffer by decoding at least one operation of a particular block belonging to the first group of blocks in parallel with decoding at least one operation of the tail end block.

In one embodiment, each variable-length instruction stored in the instruction buffer includes a header associated with the bit bundle of the variable-length instruction, wherein the header includes information related to length of the variable-length instruction. The decode stage can be configured to process the header and use the information related to length of the variable-length instruction contained within the header to isolate and align the tail end block. The decode stage can include shifter circuitry for isolating and aligning the tail end block, wherein the operation of the shifter circuitry is controlled by a shifter tap value supplied thereto. The information related to length of the variable-length instruction included as part of the header can be a particular shifter tap value corresponding to the length of the variable-length instruction, which is supplied to the shifter circuitry for isolating and aligning the tail end block.

In another embodiment, the first group of blocks includes a head end block disposed adjacent the head end of the bit bundle of the given variable-length instruction, and decode stage can be configured to speculatively decode at least one operation of the head end block. Each variable-length instruction stored in the instruction buffer can include a header associated with the bit bundle of the variable-length instruction, wherein the header includes information related to a number of slots for the head end block of the variable-length instruction. The decode stage can be configured to process the header and use the information related to the number of slots of the head end block in order to select or ignore results of the speculative decode of the at least one operation of the head end block for supply to execution logic.

In yet another embodiment, the decode stage can process the given variable-length instruction by parsing and decoding operations for each one of the first group of blocks in a sequential block-by-block manner that follows the logical forward order of the first group of blocks. The sequential block-by-block parsing and decoding of the operations of first group of blocks can be carried out by a pipeline of stages. Similarly, the decode stage can process the given variable-length instruction by parsing and decoding operations for each one of the second group of blocks in a sequential block-by-block manner that follows the logical reverse order of the second group of blocks. The sequential block-by-block parsing and decoding of the operations of second group of blocks can be carried out by a pipeline of stages.

In another embodiment, each variable-length instruction stored in the instruction buffer can include a header associated with the bit bundle of the variable-length instruction, wherein the header includes information related to a number of slots for at least one block of the variable-length instruction. The decode stage can be configured to process the header and use the information related to the number of slots for the at least one block in order to isolate and align the one or more blocks of the variable-length instruction. The decode stage can include block shifter circuitry for processing a corresponding block, wherein the operation of the block shifter circuitry is controlled by a shifter tap value supplied thereto. The information of the header that is related to the number of slots for the at least one block can be a particular shifter tap value corresponding to number of slots for the corresponding block, which is supplied to the block shifter circuitry for isolating and aligning the corresponding block.

Each slot and corresponding operation that is part of a given block can have a predefined fixed-length.

The variable-length instruction stored in the instruction buffer can include a header associated with the bit bundle of the variable-length instruction, wherein the header and the tail end of the bit bundle are both aligned on byte boundaries with an offset of at least one bit between the first group of blocks and the second group of blocks.

The computer processor can further include an instruction cache, operably coupled to the instruction buffer, configured to store at least one variable-length instruction for supply to the instruction buffer; an instruction fetch unit, operably coupled to the instruction buffer and the instruction cache, that is configured to fetch at least one variable-length instruction from the instruction cache for supply to the instruction buffer; and/or execution logic that is operably coupled to the decode stage, wherein the execution logic is configured with control signals generated by the decode stage such that the execution logic carries out the operations of the blocks of the given variable-length instruction.

Another aspect of the present disclosure is directed to a computer processor (and corresponding method of instruction processing) that includes an instruction buffer configured to store at least one instruction having a header and corresponding bit bundle, wherein the header includes at least one field representing a shifter tap number. A decode stage, which is operably coupled to the instruction buffer, is configured to process the instruction stored by the instruction buffer by processing the header and controlling shifter circuitry based on the shifter tap number of the header.

In one embodiment, the shifter tap number of the header can correspond to length of the instruction, and the shifter tap number processed by the decode stage can be used to control an instruction shifter that aligns the next instruction stored in the instruction buffer.

In another embodiment, the bit bundle of the instruction includes a plurality of slots each defining a corresponding operation, wherein the plurality of slots and corresponding operations are logically partitioned into at least one block. The shifter tap number can be a value that corresponds to the length of a given block within the bit bundle of the instruction. The shifter tap number can be processed by the decode stage to control shifter circuitry that is configured to isolate and align bits of the bit bundle of the instruction that correspond to the given block.

In yet another embodiment, the bit bundle of the instruction has a fixed-length that follows a particular instruction encoding format. The shifter tap number can be a predefined value that corresponds to the fixed-length of the bit bundle of the particular instruction encoding format. The shifter tap number can be processed by the decode stage is used to control shifter circuitry that is configured to isolate bits of the bit bundle of the instruction that corresponds the fixed-length of the bit bundle of the particular instruction encoding format.

Still another aspect of the present disclosure is directed to a computer processor (and corresponding method of instruction processing) that includes an instruction buffer configured to store at least one variable-length instruction having a bit bundle that is logically organized as a plurality of slots each defining a corresponding operation, wherein the bit bundle is bounded by a head end and a tail end with a first group of slots extending from the head end of the bit bundle toward the tail end of the bit bundle and a second group of slots extending from the tail end of the bit bundle toward the head end of the bit bundle. A decode stage is operably coupled to the instruction buffer and is configured to process a given variable-length instruction stored by the instruction buffer by decoding at least one operation of a particular slot belonging to the first group of slots in parallel with decoding at least one operation of a particular slot belonging to the second group of slots.

The second group of slots can include a tail end slot disposed adjacent the tail end of the bit bundle of the given variable-length instruction. The decode stage can be configured to decode at least one operation of the particular slot belonging to the first group of slots in parallel with decoding at least one operation of the tail end slot.

Each variable-length instruction stored in the instruction buffer can include a header associated with the bit bundle of the variable-length instruction, wherein the header includes information related to length of the variable-length instruction. The decode stage can be configured to process the header and use the information related to length of the variable-length instruction contained within the header to isolate bits that encode the at least one operation of the tail end slot.

BRIEF DESCRIPTION OF THE DRAWINGS

FIG. 1A is a schematic diagram of the logical organization of an instruction according to an embodiment of the present disclosure, where the instruction is loaded into the memory system of a computer processing system.

FIG. 1B is a schematic diagram of an exemplary embodiment of the header of the instruction of FIG. 1A.

DETAILED DESCRIPTION OF THE ILLUSTRATIVE EMBODIMENTS

Figure 2:
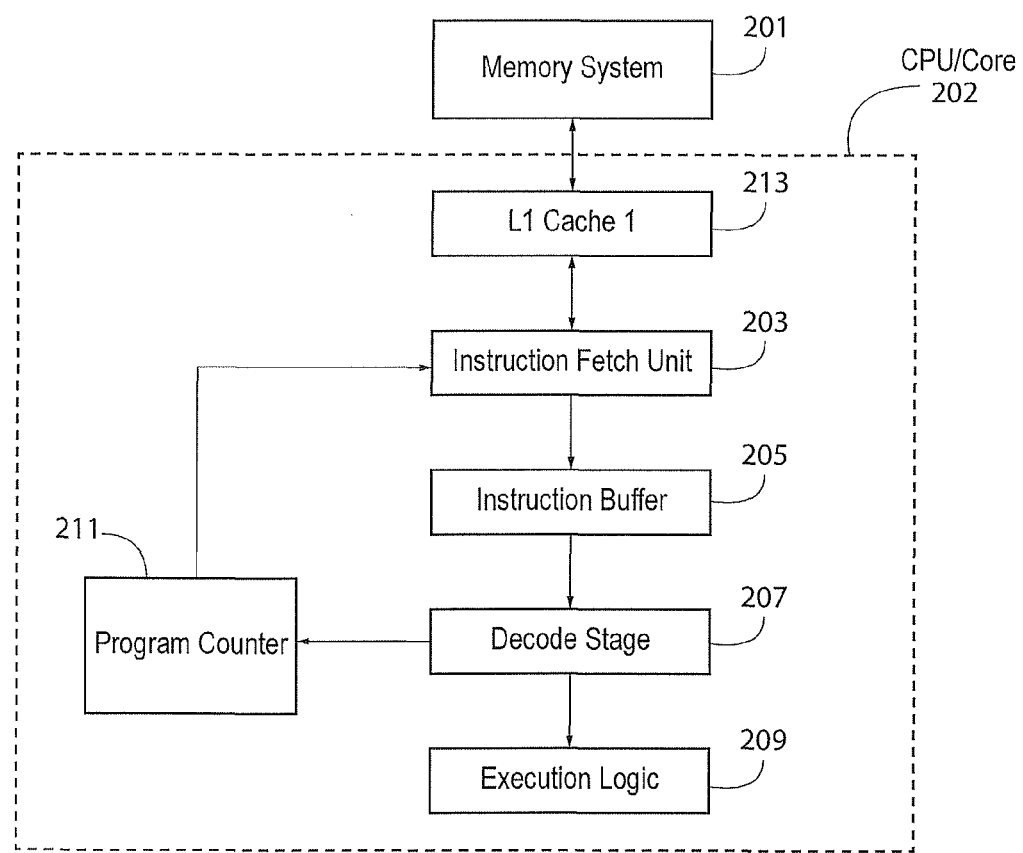
FIG. 2 is a schematic block diagram of a computer processing system according to an embodiment of the present disclosure.

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, or branch operation.

The term "instruction" is a unit of logical encoding including a number of operations where all of the operations of the instruction are semantically performed together.

The term "slot" is a unit of logical encoding included within an instruction that is specific to an operation of the instruction.

The term "bundle" is a unit of physical encoding for the operations of an instruction. Thus, an instruction decoder receives a bundle to decode.

The term "block" is a unit of physical encoding for the operations of a grouping of one or more slots within a given instruction. Thus, a bundle can include one or more blocks.

In accordance with the present disclosure, a sequence of instructions each having the form shown in FIG. 1A is loaded into the memory for execution. The instruction 100 includes a header 102 of fixed-length and an associated bundle 104 of variable-length that defines a number of operations or "opcodes." The bundle 104 includes a number of blocks (for example, up to four blocks labeled "1F", "2F", 3F", "3R" and "2R"), where each block encodes one or more operations in a variable number of slots. The slots and thus the opcodes for each given block have a predefined fixed bit-length, which can vary within the given block and can vary over the blocks. For illustration, consider one non-limiting example where Block 1F can have three slots (labeled 0, 1, 2) where the Block 1F slot 0 opcodes are always 11 bits in length, the Block 1F slot 1 opcodes are always 9 bits in length, and the Block 1F slot 2 opcodes are always 14 bits in length. While all the bit-lengths of the various slots and operations within Block 1F (or any other block in the bundle 104) may be the same, they are not necessarily the same. What is the same (or fixed) is for a particular slot within a particular block all operations have a fixed bit length. The bundle 104 has a head end 106 disposed opposite a tail end 108 as shown. The head end 106 is located at the first bit of the first slot of the bundle 104 (which is part of block 1F in the instruction of FIG. 1A), while the tail end 108 is located at the last bit of the last slot of the bundle 104 (which is part of Block 2R in the instruction of FIG. 1A). The blocks of the bundle 104 are further organized into two distinct groups of blocks: a forward group of blocks and a reverse group of blocks. The forward group of blocks extends from the head end 106 toward the tail end 108 (for example, Blocks 1F, 2F and 3F in the instruction of FIG. 1A). The reverse group of blocks extends from the tail end 108 toward the head end 106 (for example, Blocks 2R, 3R in the instruction of FIG. 1A). Thus, the slots and blocks of the forward group of blocks extend along a forward order, while the slots and blocks of the reverse group of blocks extend along a reverse order as shown in FIG. 1A. The forward group of blocks includes a head end block located adjacent the head end of the bundle 104, and the reverse group of clots includes a tail end block located adjacent the tail end of the bundle 104. Both the header 102 and the tail end 108 of the bundle 104 can be aligned on byte boundaries with an offset 110 from zero to one less than the bit length of a byte between the forward group of blocks and the reverse group of blocks as shown. Moreover, the slots of each block and thus the blocks themselves are not necessarily byte sized or aligned on byte boundaries, which leads to the offset 110. Thus, it is possible and likely that there will be an offset of one through seven bits between the forward group of blocks and the reverse group of blocks.

Note that the labeling of the blocks of the instructions in FIG. 1A include a two part identifier. The first part of the identifier (1 or 2 or 3) correspond to a logical order that the blocks can be processed in. In the event that more than one block shares a common first identifier, these blocks can be decoded in parallel with one another. The second part of the identifier (F or R) corresponds to the group (F for forward group and R for reverse group) that the blocks belong to. Thus, Blocks 1F, 2F, and 3F belong to the forward group of blocks, and Blocks 2R and 3R belong to the second group of blocks. Block 1F can be decoded first, followed by the decoding of Blocks 2F and 2R in parallel, followed by the decoding of Blocks 3F and 3R. Also note that there can be a wide variation in the arrangement of blocks in the bundle of the instruction. Examples of such variations include (1F, 2R), (1F, 2F, 2R), (1F, 2F, 3F, 2R), (1F, 2F, 3R, 2R), (1F, 2F, 3F, 3R, 2R of FIG. 1A), (1F, 2F, 3F, 4F, 3R, 2R) and so on.

As shown in FIG. 1B, the header 102 of the instruction encodes information related to the encoding of the instruction, including:
- a length field 112, which encodes information related to the length of the instruction; and
- one or more block fields 114, which encodes information related to the number of slots in the block(s) of the instruction.

The header 102 (and its contents) is placed at a fixed position in the instruction (though not necessarily at the beginning) Thus, the header as well as the opcode(s) of the first block of the forward group of blocks of the bundle 104 (i.e., the head end Block 1F in the instruction of FIG. 1A) can be accessed in the first decode cycle without otherwise examining the instruction contents.

A sequence of the variable length instructions 100 is stored in the memory system 201 and processed by a CPU (or Core) 202 as shown in the exemplary embodiment of FIG. 2. The CPU (or Core) 202 includes a number of instruction processing stages including an instruction fetch unit 203, an instruction buffer 205, a decode stage 207 and execution logic 209 that are arranged in a pipeline manner as shown. The CPU 202 (or Core) 202 also includes a program counter 211 an L1 instruction cache 213.

The L1 instruction cache 213 is logically part of the hierarchy of the memory system 201. It is a cache that stores copies of instruction portions stored in the memory system 201 in order to reduce the latency (i.e., the average time) for accessing the instruction portions stored in the memory system 201. In order to reduce such latency, the L1 instruction cache 213 can take advantage of two types of memory localities, including temporal locality (meaning that the same instruction will often be accessed again soon) and spatial locality (meaning that the next memory access is often very close to the last memory access or recent memory accesses). The L1 instruction cache 213 can be organized as a set-associative cache structure, a fully associative cache structure, or a direct mapped cache structure as is well known in the art. The hierarchy of the memory system 201 can also include additional levels of cache memory, such as a level 2 and level 3 caches, as well as system memory. One or more of these additional levels of the cache memory can be integrated with the CPU 202 as is well known. The details of the organization of the memory hierarchy are not particularly relevant to the present disclosure and thus are omitted from the figures of the present disclosure for sake of simplicity.

The program counter 211 stores the memory address for a particular variable-length instruction 100 and thus indicates where the instruction processing stages are in processing the sequence of instructions 100. The memory address stored in the program counter 211 can be used to control the fetching of the instructions by the instruction fetch unit 203. Specifically, the program counter 211 can store the memory address for the instruction to fetch. This memory address can be derived from a predicted (or resolved) target address of a control-flow operation (branch or call operation), the saved address in the case of a return operation, or the sum of memory address of the previous instruction and the length of previous instruction. The memory address stored in the program counter 211 can be logically partitioned into a number of high-order bits representing a cache line address ($ Cache Line) and a number of low-order bits representing a byte offset within the cache line for the instruction.

The instruction fetch unit 203, when activated, sends a request to the L1 instruction cache 213 to fetch a cache line from the L1 instruction cache 213 at a specified cache line address ($ Cache Line). This cache line address can be derived from the high-order bits of the program counter 211. The L1 instruction cache 213 services this request (possibly accessing higher levels of the memory system if missed in the L1 instruction cache 213), and supplies the requested cache line to the instruction fetch unit 203. The instruction fetch unit 203 passes the cache line returned from the L1 instruction cache 213 to the instruction buffer 205 for storage therein.

The decode stage 207 is configured to decode one or more instructions stored in the instruction buffer 207. Such decoding generally involves determining the length of the instruction, isolating one or more blocks of the instruction, and parsing and decoding the individual blocks to determine the type of operation(s) encoded by the block and generate control signals required for execution of the operations encoded by the block by the execution logic 209. The parsing and decoding of a block can involve parsing the bits of the block into smaller slot-sized units according to the logical arrangement of slots within the block and decoding the operations of the units to generate control signals for execution of the operations of the block. The execution logic 209 utilizes the results of the decode stage 207 to execute the operations encoded by the instructions.

The possible operations encoded by a given instruction can be constrained by design and organized into groups corresponding to the blocks of the instruction. In one embodiment, the possible operations of an instruction set are partitioned into groups of operations with the same length (and, generally similar use of functional units) while the group widths differ from each other with generally different functional requirements. For example, the operations can be grouped into four groups as follows: a first group for dyadic operations that take two operand addresses, a second group for triadic operations that take three operands, a third group for pure source operations that take a special register argument or similar argument but no ordinary operand arguments, and fourth group of pure sink operations that take one operand and a destination (such as a special register). Each of these groupings has their own execution functional requirements, which are uniform within the group. Thus, each compute dyadic operation needs a computation functional unit and the operand data paths to feed it, while each pure source operation needs a port into whatever is the source of data. The number of each kind of these resources is defined by the hardware of the execution logic of the processor. In effect, each grouping defines a (wide) sub-instruction in the encoding whose length is constrained by the hardware of the execution logic of the processor. For example, if the execution logic of the processor has only five computational pipelines for the group for dyadic operations that take two operand addresses, then the exemplary encoding can support only zero through five of such operations and no more, and similarly for the other groupings. Consequently, the encoding for each grouping (which is referred to as a block herein) consists solely of operations with identical or similar format, of known maximum number. Moreover, within a block only the operations of that format can exist, so it is not necessary to detect (by parse) whether some other kind of operation is present. Necessarily the encoding reflects the population of slots and of operations in each slot, and these can be varied by the design of the processor. In this configuration, where the operations of each given block all use the same format, each block can be decoded with a fixed-length decoding operation once it has been located and extracted from the bundle.

The block format of the instruction 100 can present a problem with regard to locating the blocks within the instruction. At the whole instruction level, each block can be thought of as a single variable width pseudo-operation within the instruction. That is, the instruction can be thought of as groups of pseudo-operations, each of which is of variable width. Consequently, at this level, the problem reduces to decoding the variable-width pseudo-operations of the instruction, or in other words to isolating the blocks. In one embodiment, the blocks or groups of pseudo-operations can be located within the instruction utilizing the block field(s) 114 of the header 102. In this case, the block field(s) 114 provide information that describe the number of slots for each pseudo-operation block in the particular instruction. Because (within each pseudo-operation block) the operations are of known length for each slot within the block, knowing how many there are also tells the length of the pseudo-operation block as a whole. This block length can be used to isolate each pseudo-operation block for fixed-width decoding of the opcode(s) contained in its slots.

This scheme can be extended further to take advantage of other aspects of the decoding process used. As described elsewhere, the header 102 also contains length field 112 that contains information (such as a byte count) related to the length of the whole instruction. As a result, the block field 114 for one of the pseudo-operation blocks can be omitted because it can be derived during decode from the slot counts of the other pseudo-operation blocks and the overall instruction length.

Moreover, the decode stage 207 can be configured to use the length field 112 of the header 102 to quickly locate the tail end 106 of the bundle 104 and then decode the reverse group of blocks (starting with the slots of the block at tail end 106 of the bundle 104, such as Block 2R in FIG. 1A) in parallel with the decode of the first group of blocks (such as the Block 2F of FIG. 1A).

Figure 3:
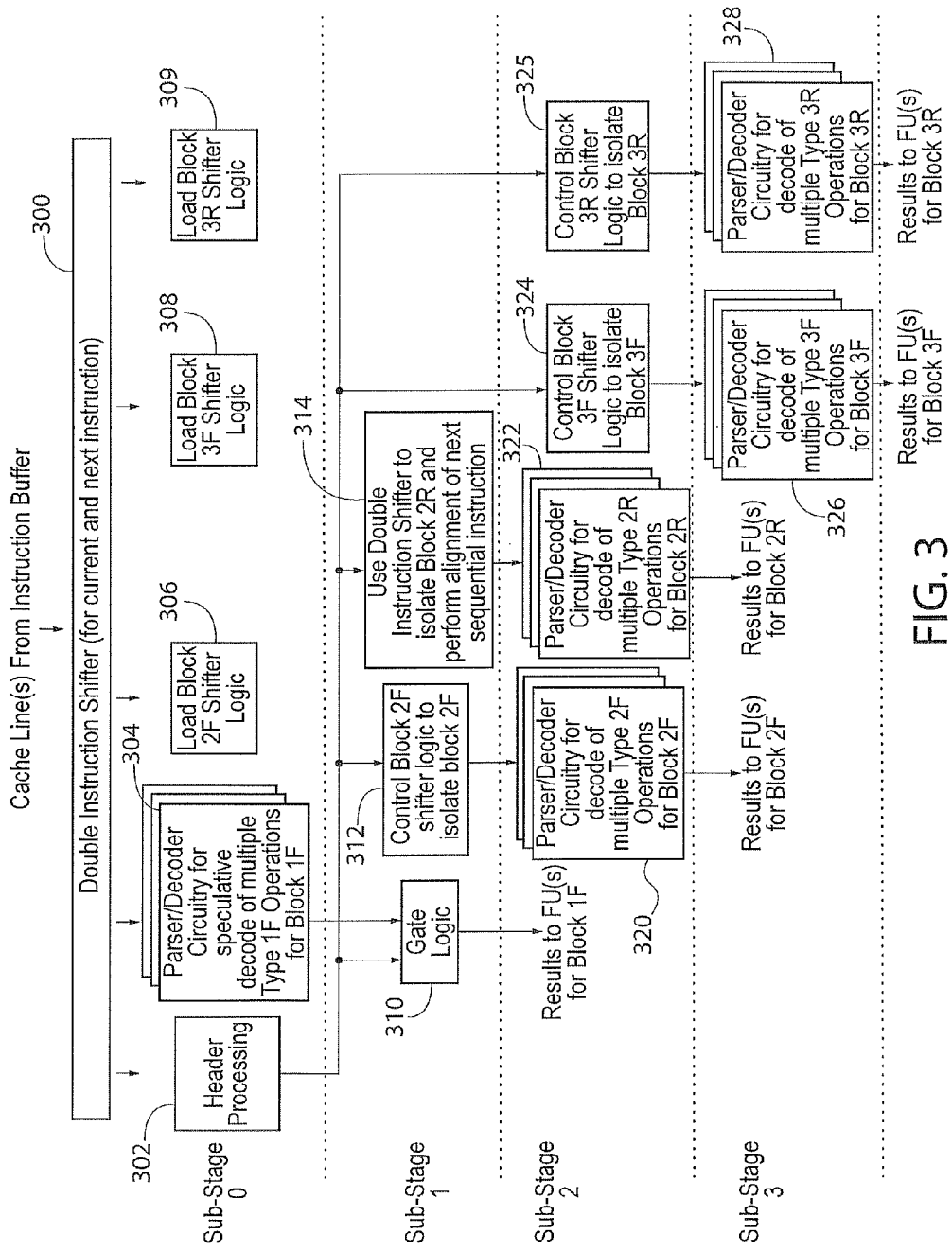
FIG. 3 is schematic diagram that illustrates exemplary operations carried out by one of the decode stage of FIG. 2 in processing the instruction of FIG. 1A.

FIG. 3 is a schematic diagram that illustrates an exemplary embodiment of the decode stage 207 of FIG. 2 for decoding the instruction of FIG. 1. The decode stage 207 assumes that the instruction has been loaded into a double instruction shifter 300, which is configured to process two cache lines and shift the cache lines such that the current instruction is aligned in the lower order bits of the double instruction shifter 300. This alignment operation can be performed as part of the instruction fetch process and thus conceptually can be part of the instruction buffer 205. The decode stage 207 includes a number of sub-stages (for example, the four sub-stages labeled 0, 1, 2 and 3) arranged in a parallel-pipelined configuration. Each sub-stage carries out a number of operations in a parallel manner as shown.

In sub-stage 0, header processing circuitry 302 operates on the header 102 of the current instruction as supplied by the double instruction shifter 300 to process the length field 112 and the block fields 114 of the header 102. The header processing circuitry 302 uses the length field 112 of the header 102 as well as the block field 114 of the header 102 that relates to the number of slots in Block 2R of the current instruction in order to derive control signals that are supplied the double instruction shifter 300 for use in 314 of sub-stage 1 as described below. The header processing circuitry 302 also uses the block field 114 of the header 102 that relates to the number of slots in Block 1F of the current instruction in order to derive control signals that are supplied to the gate logic 310 for use in sub-stage 1 as described below. The header processing circuitry 302 also uses the block field 114 of the header 102 that relate to the number of slots in Block 2F of the current instruction in order to derive control signals that are supplied to the Block 2F shifter logic for use in 312 of sub-stage 1 as described below. The header processing circuitry 302 also uses the block fields 114 of the header 102 that relate to the number of slots in Blocks 3F and 3R of the current instruction in order to derive control signals that are supplied to the block 3F shifter logic and to block 3R shifter logic for use in 324 and 325 in sub-stage 2 as described below.

Furthermore, in sub-stage 0, the maximum number of possible bits for opcodes of Block 1F of the current instruction as stored in the double instruction shifter 300 are passed from the double instruction shifter 300 to an array of parser/decoder circuits 304. The array of parser/decoder circuits 304 is configured to perform speculative parsing and decoding on the supplied opcode bits for the predefined maximum number of slots and corresponding opcodes for Block 1F as constrained by the design of the instruction set architecture of the processor. The speculative parsing and decoding of Block 1F can involve parsing the bits of Block 1F into smaller slot-sized units according to the logical arrangement of slots within Block 1F and decoding the opcodes of the units to generate control signals for execution of the opcodes of Block 1F. The parsing and decoding operations are speculative in nature because the number of bits for the valid slots of Block 1F for the particular instruction are unknown. However, the alignment of the slots of Block 1F for the particular instruction is known (offset from the instruction address by the fixed-length of the header 102) and the pre-defined length of each Block 1F slot and corresponding opcode is also known. These constraints can be used to speculatively parse and decode the maximum number of slots for Block 1F, even though some of the slots are invalid.

Furthermore, in sub-stage 0, the bundle 104 for the current instruction (or portions thereof) as stored in the double instruction shifter 300 is loaded into shifter logic for Block 2F (306) as well as into the shifter logic for Block 3F (308) as well as into the shifter logic for block 3R (309).

In sub-stage 1, the gate logic 310 is configured to use the control signals supplied by the header processing circuitry 302 to selectively pass (or ignore) the results of the speculative decode operations performed by the array of parser/decoder circuits 304 for supply (issue) to the functional units of the execution logic 209 that execute the opcodes of the slots of Block 1F in sub-stage 2. In this manner, the block field 114 of the header 102 that relates to the number of slots in Block 1F of the current instruction is processed by the header processing circuitry 302 and the gate logic 304 such that only the decode results of valid slots within Block 1F are supplied (issued) to the functional units of the execution logic 209 that execute the operations of the slots of Block 1F, and the decode results for slots that are not part of Block 1F are ignored. The execution by the functional units of execution logic 209 can involve parallel execution of multiple opcodes in accordance with the valid results of the speculative decode operations output by the array 304.

Furthermore, in 314 of sub-stage 1, the double instruction shifter 300 is configured to use the control signals supplied by the header processing circuitry 302 in order to isolate and align the opcodes of Block 2R of the current instruction. The opcodes of Block 2R of the current instruction can be output from the double instruction shifter 300 in a format (such as a right-aligned format or other predefined format) suitable for processing by the array of parser/decoder circuits 322. The isolated bits of the opcodes for Block 2R of the current instruction as output from the double instruction shifter 300 are loaded into the array of parser/decoder circuits 322 for processing in sub-stage 2 as described below. In controlling the operation of the double instruction shifter 300 in isolating the bits for the opcodes of Block 2R, the bit position for the one end of Block 2R that is adjacent the tail end of the envelope 104 can be derived from the length field 112 of the header 102, and the bit position for the other end of Block 2R that is adjacent Block 3R can be derived from the block field 114 of the header 102 that relates to the number of slots in Block 2R. Furthermore, the double instruction shifter 300 is configured to use the control signals supplied by the header processing circuitry 302 in order to perform bit shift operations that align the next sequential instruction within the lower order bits of the double instruction shifter 300. In this manner, the length field 112 of the header 102 that relates to the length of the instruction is processed by the header processing circuitry 302 to perform bit shifting operations that align the next sequential instruction within the double instruction shifter 300 (for supply to the header processing circuitry 302, decoder circuit array 304 and shifter logic 306/308/309 in the next cycle).

Furthermore, in sub-stage 1, the block 2F shifter logic (312) is configured to use the control signals supplied by the header processing circuitry 302 in order to isolate and align the opcodes of Block 2F of the current instruction. The opcodes of block 2F of the current instruction can be output from the block 2F shifter logic in a format (such as a left-aligned format or other predefined format) suitable for processing by the array of parser/decoder circuits 320. The isolated bits of the opcodes for block 2F of the current instruction as output from the block 2F shifter logic are loaded into the array of parser/decoder circuits 320 for processing in sub-stage 2 as described below. In controlling the operation of the block 2F shifter logic in isolating the bits for the opcodes of Block 2F, the bit position for the one end of Block 2F that is adjacent block 1F can be derived from the block field 114 of the header 102 that relates to the number of slots in Block 2F and the fixed length of the header 102, and the bit position for the other end of Block 2F that is adjacent Block 3F can be derived from the block field 114 of the header 102 that relates to the number of slots in Block 2F.

In sub-stage 2, the array of parser/decoder circuits 320 is configured to perform parallel fixed-length parsing and decoding for each one of the opcodes (slots) of Block 2F represented by the bits passed from the block 2F shifter logic. The parsing and decoding of Block 2F can involve parsing the bits of Block 2F into smaller slot-sized units according to the logical arrangement of slots within Block 2F and decoding the opcodes of the units to generate control signals for execution of the opcodes of Block 2F. The results of such parallel fixed-length parsing and decode operations are output by the array 320 for supply (issue) to the functional units of the execution logic 209 that execute the opcodes of the slots of Block 2F of the current instruction in sub-stage 3. The execution by the functional units of execution logic 209 can involve parallel execution of multiple opcodes of Block 2F in accordance with the results of the decode operations output by the array 322.

Furthermore, in sub-stage 2, the array of parser/decoder circuits 322 is configured to perform parallel fixed-length parsing and decoding for each one of the opcodes (slots) of Block 2R represented by the bits passed from the double instruction shifter 300. The parsing and decoding of Block 2R can involve parsing the bits of Block 2R into smaller slot-sized units according to the logical arrangement of slots within Block 2R and decoding the opcodes of the units to generate control signals for execution of the opcodes of Block 2R. The results of such parallel fixed-length parsing and decode operations are output by the array 322 for supply (issue) to the functional units of the execution logic 209 that execute the opcodes of the slots of Block 2R in sub-stage 3. The execution by the functional units of execution logic 209 can involve parallel execution of multiple opcodes of Block 2R in accordance with the results of the decode operations output by the array 322.

Furthermore, in sub-stage 2, the block 3F shifter logic (324) is configured to use the control signals supplied by the header processing circuitry 302 in order to isolate and align the opcodes of Block 3F of the current instruction. The opcodes of Block 3F of the current instruction can be output from the block 3F shifter logic in a format (such as a left-aligned format or other predefined format) suitable for processing by the array of parser/decoder circuits 326. The isolated bits of the opcodes for Block 3F of the current instruction as output from the block 3F shifter logic are loaded into the array of parser/decoder circuits 326 for processing in sub-stage 3 as described below. In controlling the operation of the block 3F shifter logic in isolating the bits for the opcodes of Block 3F, the bit position for the one end of Block 3F that is adjacent Block 2F can be derived from the bit position of the adjacent end of Block 2F, and the bit position for the other end of Block 3F can be derived from the block field 114 of the header 102 that relates to the number of slots in Block 3F.

Furthermore, in sub-stage 2, the block 3R shifter logic (325) is configured to use the control signals supplied by the header processing circuitry 302 in order to isolate and align the opcodes of Block 3R of the current instruction. The opcodes of block 3R of the current instruction can be output from the block 3R shifter logic in a format (such as a right-aligned format or other predefined format) suitable for processing by the array of parser/decoder circuits 328. The isolated bits of the opcodes for Block 3R of the current instruction as output from the block 3R shifter logic are loaded into the array of parser/decoder circuits 328 for processing in sub-stage 3 as described below. In controlling the operation of the block 3R shifter logic in isolating the bits for the opcodes of Block 3R, the bit position for the one end of Block 3R that is adjacent Block 2R can be derived from the bit position of the adjacent end of Block 2R, and the bit position for the other end of Block 3R can be derived from the block field 114 of the header 102 that relates to the number of slots in Block 3R.

In sub-stage 3, the array of parser/decoder circuits 326 is configured to perform parallel fixed-length parsing and decoding for each one of the opcodes (slots) of Block 3F represented by the bits passed from the block 3F shifter. The parsing and decoding of Block 3F can involve parsing the bits of Block 3F into smaller slot-sized units according to the logical arrangement of slots within Block 3F and decoding the opcodes of the units to generate control signals for execution of the opcodes of Block 3F. The results of such parallel fixed-length parsing and decode operations are output by the array 326 for supply (issue) to the functional units of the execution logic 209 that execute the opcodes of the slots of Block 3F. The execution by the functional units of execution logic 209 can involve parallel execution of multiple opcodes of Block 3F in accordance with the results of the decode operations output by the array 326.

Furthermore, in sub-stage 3, the array of parser/decoder circuits 328 is configured to perform parallel fixed-length decoding for each one of the opcodes (slots) of Block 3R represented by the bits passed from the block 3R shifter. The parsing and decoding of Block 3R can involve parsing the bits of Block 3R into smaller slot-sized units according to the logical arrangement of slots within Block 3R and decoding the opcodes of the units to generate control signals for execution of the opcodes of Block 3R. The results of such parallel fixed-length parsing and decode operations are output by the array 328 for supply (issue) to the functional units of the execution logic 209 that execute the opcodes of the slots of Block 3R. The execution by the functional units of execution logic 209 can involve parallel execution of multiple opcodes of Block 3R in accordance with the results of the decode operations output by the array 328.

In one embodiment, the output of the shifter logic circuits for each respective block in the instruction encoding (e.g., Blocks 1F, 2F, 3F, 3R, 2R) can be supplied over multiple taps (typically identified by tap numbers) that correspond to different logical shift operations (positions where the shift can start). Note that the length of the bundle in the decode stage 207 (the granularity) may not be the same as the byte length. For example, bundles of up to four two-byte operations need only four shifter taps, although the byte length may be as much as eight bytes. Moreover, each respective block shifter logic circuit can be the equivalent of an N-way multiplexer tree where N is the number of possible shifter tap numbers. In this case, the speed of each respective block shifter logic circuit is logarithmic in N and thus there is a limit to the number of different bundle lengths that can be shifted in one cycle. In practice this is not a constraint for up to 64 different bundle sizes. In this configuration, the block field(s) 114 of the header 102 can employ shifter tap numbers that relate to the number of slots in each respective block. These shifter tap numbers are processed and output to the block shifter circuits in order to isolate the respective blocks of the encoding. Similarly, the output of the double instruction shifter circuit can be supplied over multiple taps (typically identified by tap numbers) that correspond to different logical shift operations (positions where the shift can start). Thus, the length field 112 of the header 102 can employ a shifter tap number that relates to the total length of the instruction for use by the double instruction shifter in isolating the bits of Block 2R of the current instruction and for use in aligning the bytes of the next instruction.

Note that the block format internal to a bundle can preclude certain shifter tap numbers for the blocks and the maximum shifter tap number is rarely a power of two which would fit naturally in a bit field in the header. Thus, there can be some left-over and unused shifter tap numbers. In one embodiment, certain ones of these unused shifter tap numbers can be used as part of the block field 114 of the header 102 to represent instructions with different formatting for the bit bundle and thus alternate encodings. To support such alternate encodings, the header processing circuit of the decode stage 207 can be configured to process (parse) the block field 114 of the header 102 to identify the specific shifter tap number corresponding to a given alternate encoding and enable decode circuitry that processes the alternate encoding of the bit envelop to generate appropriate control signals for execution of one or more operation represented by the alternate encoding in the execution logic 209. Two examples of such alternate encodings are described below.

One of these encodings, referred to herein as the "svelte encoding," is a compact design that uses a simplified header containing only an instruction field 112 that includes the shifter tap number corresponding to the instruction length and a block field 114 that includes a shifter tap number that is not otherwise valid to indicate the special encoding of the svelte encoding format. Squeezing out the rest of the header can save multiple bits or more. All svelte instruction formats have the same byte length including the simplified header and exactly one predefined fixed-length slot. Thus, the decode circuitry that processes the svelte encoding can include a shifter circuit that is configured to isolate the fixed-length slot based upon the predefined fixed-length of the slot. This shifter circuit can be part of the shifter circuits that process the block encoding format as described above, or possibly designed specifically for this function.

Another one of these encodings, referred to herein as the "skinny encoding," is also a compact design (even more compact than the "svelte encoding"), which uses a simplified header containing only an instruction field 112 that includes a shifter tap number that is not otherwise valid to indicate a one or two byte total instruction length. The other bits of the skinny instruction (the bit bundle other than the header) represent an integer (or other address) that is used to index a table of instruction decode results for block instructions of FIG. 1A that are especially common in typical code. The decode results read from the table can be used as the output of the decode stage 207, completely bypassing the decode process for block instructions other than instruction shifting. Note the header processing of the skinny instruction controls the instruction shifter to shift by one or two bytes for the next instruction, but the whole block-isolation logic is bypassed or ignored.

In other embodiments, the double-ended decoding operations as described herein can also be used for instruction streams of other variable-length instruction formats. For example, it can used to decode streams of single-operation variable-length instructions if some of these instructions contain a length indicator that can be used to locate the start of an instruction later in the stream. Many instruction encodings have a few instructions with unused encodings that could be used for this purpose. The length indicator may be part of each instruction or may be associated with some group of instructions when the group is small enough that a linear parse within the group is practical but a linear parse across groups is not.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the functionality of the CPU 101 as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:

1. A computer processor comprising:
an instruction buffer configured to store at least one variable-length instruction having a variable-length bit bundle bounded by a head end and a tail end with a plurality of fixed-length slots, wherein the plurality of fixed-length slots are logically partitioned into a plurality of distinct blocks with a first group of blocks extending in a logical forward order from the head end of the bit bundle toward the tail end of the bit bundle and a second group of blocks extending in a logical reverse order from the tail end of the bit bundle toward the head end of the bit bundle, wherein the second group of blocks includes a tail end block disposed adjacent the tail end of the bit bundle, wherein separate and distinct operations are encoded in the fixed-length slots of the first group of blocks and in the fixed-length slots of the second group of blocks, and wherein each variable-length instruction includes a fixed-length header separate and distinct from the variable-length bit bundle, wherein the header is located at a predefined position in the variable-length instruction and includes a first field that encodes information related to entire length of the variable-length instruction; and
a decode stage, coupled to the instruction buffer, that is configured to process a given variable-length instruction stored by the instruction buffer by i) processing the header and using the information related to entire length of the variable-length instruction as encoded by the first field of the header to locate the tail end of the bit bundle and isolate and align the tail end block followed by ii) decoding at least one operation defined by the fixed-length slots of a particular block belonging to the first group of blocks in parallel with decoding at least one different operation defined by the fixed-length slots of the tail end block.

2. A computer processor according to claim 1, wherein:
the decode stage is configured to process a given variable-length instruction stored by the instruction buffer by parsing and decoding operations defined by the fixed-length slots of a particular block belonging to the first group of blocks in parallel with parsing and decoding different operations defined by the fixed-length slots of the tail end block.

3. A computer processor according to claim 1, wherein:
the decode stage includes shifter circuitry for isolating and aligning the tail end block, wherein the operation of the shifter circuitry is controlled by a shifter tap value supplied thereto; and
the information related to entire length of the variable-length instruction that is encoded by the first field of the header is a particular shifter tap value corresponding to the length of the variable-length instruction, which is supplied to the shifter circuitry for isolating and aligning the tail end block.

4. A computer processor according to claim 1, wherein:
the first group of blocks includes a head end block disposed adjacent the head end of the bit bundle of the given variable-length instruction; and
the decode stage is configured to speculatively decode at least one operation defined by the fixed-length slots of the head end block.

5. A computer processor according to claim 4, wherein:
the decode stage is configured to speculatively parse and decode operations defined by the fixed-length slots of the head end block.

6. A computer processor according to claim 4, wherein:
the header further includes a second field that encodes information related to a number of fixed-length slots for the head end block of the variable-length instruction; and
the decode stage is configured to process the header and use the information related to the number of fixed-length slots of the head end block as encoded by the second field of the header in order to select or ignore results of the speculative decode of the at least one operation defined by the fixed-length slots of the head end block for supply to execution logic.

7. A computer processor according to claim 1, wherein:
the first group of blocks includes a plurality of blocks; and
the decode stage processes the given variable-length instruction by parsing and decoding operations defined by the fixed-length slots for each one of the plurality of blocks of the first group of blocks in a sequential block-by-block manner that follows the logical forward order of the first group of blocks.

8. A computer processor according to claim 7, wherein:
the sequential block-by-block parsing and decoding of the operations defined by the fixed-length slots of the plurality of blocks of the first group of blocks is carried out by a pipeline of stages.

9. A computer processor according to claim 1, wherein:
the second group of blocks includes a plurality of blocks; and
the decode stage processes the given variable-length instruction by parsing and decoding operations defined by the fixed-length slots for each one of the plurality of blocks of the second group of blocks in a sequential block-by-block manner that follows the logical reverse order of the second group of blocks.

10. A computer processor according to claim 9, wherein:
the sequential block-by-block parsing and decoding of the operations defined by the fixed-length slots of the plurality of blocks of the second group of blocks is carried out by a pipeline of stages.

11. A computer processor according to claim 1, wherein:
the header further includes a second field that encodes information related to a number of fixed-length slots for at least one block of the variable-length instruction; and
the decode stage is configured to process the header and use the information related to the number of fixed-length slots for the at least one block as encoded by the second field of the header in order to isolate and align one or more blocks of the variable-length instruction.

12. A computer processor according to claim 11, wherein:
the decode stage includes block shifter circuitry for processing a corresponding block, wherein the operation of the block shifter circuitry is controlled by a shifter tap value supplied thereto; and
the information related to the number of slots for the at least one block as encoded by the second field of the header is a particular shifter tap value corresponding to number of slots for the corresponding block, which is supplied to the block shifter circuitry for isolating and aligning the corresponding block.

13. A computer processor according to claim 1, wherein:
each fixed-length slot and corresponding operation that is part of a given block has a predefined fixed-length.

14. A computer processor according to claim 1, wherein:
the header and the tail end of the bit bundle are both aligned on byte boundaries with an offset of at least one bit between the first group of blocks and the second group of blocks.

15. A computer processor according to claim 1, further comprising:
an instruction cache, operably coupled to the instruction buffer, that is configured to store at least one variable-length instruction for supply to the instruction buffer; and/or
an instruction fetch unit, operably coupled to the instruction buffer and the instruction cache, that is configured to fetch at least one variable-length instruction from the instruction cache for supply to the instruction buffer; and/or
execution logic that is operably coupled to the decode stage, wherein the execution logic is configured with control signals generated by the decode stage such that the execution logic carries out the operations of the blocks of the given variable-length instruction.

16. A computer processor according to claim 1, wherein:
the first group of blocks includes a plurality of blocks, and the second group of blocks includes a plurality of blocks; and
the decode stage processes the variable-length instruction by i) parsing and decoding operations defined by the fixed-length slots for each one of the plurality of blocks of the first group of blocks in a sequential block-by-block manner that follows the logical forward order of the first group of blocks and ii) parsing and decoding operations defined by the fixed-length slots for each one of the plurality of blocks of the second group of blocks in a sequential block-by-block manner that follows the logical reverse order of the second group of blocks.

17. A method comprising:
storing at least one variable-length instruction in an instruction buffer, wherein the variable-length instruction has a variable-length bit bundle bounded by a head end and a tail end with a plurality of fixed-length slots, wherein the plurality of fixed-length slots are logically partitioned into a plurality of distinct blocks with a first group of blocks extending in a logical forward order from the head end of the bit bundle toward the tail end of the bit bundle and a second group of blocks extending in a logical reverse order from the tail end of the bit bundle toward the head end of the bit bundle, wherein the second group of blocks includes a tail end block disposed adjacent the tail end of the bit bundle, wherein separate and distinct operations are encoded in the fixed-length slots of the first group of blocks and in the fixed-length slots of the second group of blocks, and wherein each variable-length instruction includes a fixed-length header separate and distinct from the variable-length bit bundle, wherein the header is located at a predefined position in the variable-length instruction and includes a first field that encodes information related to entire length of the variable-length instruction; and
processing a variable-length instruction stored by the instruction buffer by i) processing the header and using the information related to entire length of the variable-length instruction as encoded by the first field of the header to locate the tail end of the bit bundle and isolate and align the tail end block followed by ii) decoding at least one operation defined by the fixed-length slots of a particular block belonging to the first group of blocks in parallel with decoding at least one different operation defined by the fixed-length slots of the tail end block.

18. A method according to claim 17, wherein:
the processing of the variable-length instruction involves parsing and decoding operations defined by the fixed-length slots of a particular block belonging to the first group of blocks in parallel with parsing and decoding different operations defined by the fixed-length slots of the tail end block.

19. A method according to claim 17, wherein:
the first group of blocks includes a head end block disposed adjacent the head end of the bit bundle of the given variable-length instruction; and
the processing of the variable-length instruction involves speculatively decoding at least one operation defined by the fixed-length slots of the head end block.

20. A method according to claim 19, wherein:
the processing of the variable-length instruction involves speculatively parsing and decoding operations defined by the fixed-length slots of the head end block.

21. A method according to claim 19, wherein:
the header further includes a second field that encodes information related to a number of fixed-length slots for the head end block of the variable-length instruction; and
the processing of the variable-length instruction involves processing the header and using the information related to the number of fixed-length slots of the head end block as encoded by the second field of the header in order to select or ignore results of the speculative decode of the at least one operation defined by the fixed-length slots of the head end block for supply to execution logic.

22. A method according to claim 17, wherein:
the first group of blocks includes a plurality of blocks; and
the processing of the variable-length instruction involves parsing and decoding operations defined by the fixed-length slots for each one of the plurality of blocks of the first group of blocks in a sequential block-by-block manner that follows the logical forward order of the first group of blocks.

23. A method according to claim 22, wherein:
the sequential block-by-block parsing and decoding of the operations defined by the fixed-length slots of the plurality of blocks of the first group of blocks is carried out by a pipeline of stages.

24. A method according to claim 17, wherein:
the second group of blocks includes a plurality of blocks; and
the processing of the variable-length instruction involves parsing and decoding operations defined by the fixed-length slots for each one of the plurality of blocks of the second group of blocks in a sequential block-by-block manner that follows the logical reverse order of the second group of blocks.

25. A method according to claim 24, wherein:
the sequential block-by-block parsing and decoding of the operations defined by the fixed-length slots of the plurality of blocks of the second group of blocks is carried out by a pipeline of stages.

26. A method according to claim 17, wherein:
the header further includes a second field that encodes information related to a number of fixed-length slots for at least one block of the variable-length instruction; and
the processing of the variable-length instruction involves processing the header and using the information related to the number of fixed-length slots for the at least one block as encoded by the second field of the header in order to isolate and align the corresponding block.

27. A method according to claim 17, wherein:
the first group of blocks includes a plurality of blocks, and the second group of blocks includes a plurality of blocks; and
the processing of the variable-length instruction involves i) parsing and decoding operations defined by the fixed-length slots for each one of the plurality of blocks of the first group of blocks in a sequential block-by-block manner that follows the logical forward order of the first group of blocks and ii) parsing and decoding operations defined by the fixed-length slots for each one of the plurality of blocks of the second group of blocks in a sequential block-by-block manner that follows the logical reverse order of the second group of blocks.

* * * * *